United States Patent
Choi et al.

(10) Patent No.: US 7,817,373 B2
(45) Date of Patent: Oct. 19, 2010

(54) COVER ASSEMBLY OF A HARD DISK DRIVE

(75) Inventors: Dong-youl Choi, Suwon-si (KR);
Myung-il Kim, Seongnam-si (KR);
Kyung-yul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 739 days.

(21) Appl. No.: 11/480,896

(22) Filed: Jul. 6, 2006

(65) Prior Publication Data

US 2007/0008697 A1     Jan. 11, 2007

(30) Foreign Application Priority Data

Jul. 7, 2005     (KR) .................. 10-2005-0061240

(51) Int. Cl.
*G11B 33/08* (2006.01)
(52) U.S. Cl. .................................. 360/97.02
(58) Field of Classification Search ............... 360/97.02
See application file for complete search history.

(56) References Cited

U.S. PATENT DOCUMENTS

| | | | |
|---|---|---|---|
| 5,029,026 A * | 7/1991 | Stefansky et al. | 360/97.02 |
| 5,282,100 A * | 1/1994 | Tacklind et al. | 360/97.02 |
| 5,394,306 A * | 2/1995 | Koenck et al. | 361/809 |
| 6,052,255 A * | 4/2000 | Kawabe et al. | 360/97.02 |
| 6,308,961 B1 * | 10/2001 | Kunikane et al. | 277/637 |
| 6,646,826 B1 * | 11/2003 | Haidari et al. | 360/97.02 |
| 6,958,884 B1 * | 10/2005 | Ojeda et al. | 360/97.02 |
| 7,199,970 B2 * | 4/2007 | Boss et al. | 360/97.02 |
| 7,256,960 B2 * | 8/2007 | Cho | 360/97.01 |
| 7,283,323 B2 * | 10/2007 | Lee | 360/97.01 |
| 7,420,771 B1 * | 9/2008 | Hanke et al. | 360/97.01 |
| 2005/0286163 A1 * | 12/2005 | Kim et al. | 360/97.02 |

FOREIGN PATENT DOCUMENTS

| | | | |
|---|---|---|---|
| JP | 2001108106 | * | 4/2001 |
| JP | 2004-046964 | | 2/2004 |
| JP | 2004-152403 | | 5/2004 |
| JP | 2004152425 | * | 5/2004 |
| JP | 2004-192750 | | 7/2004 |
| KR | 2000-0035267 | | 6/2000 |
| KR | 2003-0035282 | | 5/2003 |

* cited by examiner

*Primary Examiner*—Angel A. Castro
(74) *Attorney, Agent, or Firm*—Stanzione & Kim, LLP

(57) ABSTRACT

A cover assembly of a hard disk drive is provided. The cover assembly includes a cover member with an edge portion protruding a predetermined height from an upper surface thereof, a damping plate disposed on the upper surface of the cover member, and a damper to absorb shocks applied to the edge portion of the cover member, the damper having a support portion disposed between a bottom surface of a border portion of the damping plate and the upper surface of the cover member to support the damping plate, and a protrusion extending upward from the support portion through a gap between the edge portion of the cover member and the damping plate. The protrusion of the damper may have a height that is higher than the edge portion of the cover member, whereby external shocks applied to the cover member are absorbed more efficiently by the protrusion of the damper so that a shock energy transferred to the hard disk drive is minimized.

17 Claims, 5 Drawing Sheets

COVER ASSEMBLY OF A HARD DISK DRIVE

CROSS-REFERENCE TO RELATED APPLICATIONS

This application claims the benefit of Korean Patent Application No. 10-2005-0061240, filed on Jul. 7, 2005, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to a cover assembly of a hard disk drive having a structure that minimizes an impact of external shocks applied to the hard disk drive.

2. Description of the Related Art

A hard disk drive (HDD) is a device that reproduces data stored in a disc or records data on the disc using a read/write head. The read/write head is moved to a desired position above a surface of the disc by an actuator in order to read and/or write the data.

FIG. 1 is an exploded perspective view illustrating a conventional hard disk drive, and FIG. 2 is a partial sectional view of a cover member of the conventional hard disk drive of FIG. 1.

Referring to FIGS. 1 and 2, the conventional hard disk drive includes a base member 11, a cover member 12, a spindle motor 30 installed on the base member 11, one or more data storage discs 20 installed on the spindle motor 30, and an actuator 40 for moving a read/write head into a desired position above the disc 20 for reproducing and recording data.

The actuator 40 includes a swing arm 44 rotatably coupled to a pivot 42 installed on the base member 11, a suspension 46 installed at one end of the swing arm 44 to support a slider 48 that biases the read/write head 20 toward the surface of the disc 20, and a voice coil motor (VCM) 50 for rotating the swing arm 44. The voice coil motor 50 is controlled by a servo control system so that the swing arm 44 is rotated in a direction according to Fleming's left-hand rule by an interaction between input electric current of a VCM coil and a magnetic field of a magnet. That is, when the hard disk drive is turned ON and the disc 20 starts to rotate, the voice coil motor 50 moves the swing arm 44 in one direction to move the slider 48 that biases the read/write head into a position above the surface of the disc 20. On the other hand, when the hard disk drive is turned OFF and the disc 20 stops rotating, the voice coil motor 50 moves the swing arm 44 in an opposite direction to move the read/write head away from the surface of the disc 20.

The cover member 12 is assembled on the base member 11 using a plurality of fastening screws 18. The cover member 12 is typically made of an aluminum alloy by a die casting method. A thin damping plate 14 of stainless steel is attached on an upper surface of the cover member 12 so as to absorb shocks applied to the hard disk drive and to noise insulate the hard disk drive. The damping plate 14 is attached to the upper surface of the cover member 12 using an adhesive, for example, a double-sided adhesive tape 15 (see FIG. 2).

However, the cover member 12 has an edge portion 13 formed to protrude by a certain height C with respect to an upper surface of the damping plate 14.

Thus, external shocks applied to the hard disk drive may likely be focused on the edge portion 13 of the cover member 12. In this case, the shocks applied to the edge portion 13 of the cover member 12 are hardly absorbed by the damping plate 14 so that the shocks are substantially transferred in their entirety through the cover member 12 to an inside of the hard disk drive. As a result, the external shocks transferred to the inside of the hard disk drive are, in turn, transferred to the spindle motor 30, the disc 20, and the actuator 40, thereby causing vibrations thereof. Accordingly, the read/write head mounted on the slider 48 of the actuator 40 impacts the surface of the disc 20, thereby damaging the read/write head and the surface of the disc 20 (i.e., a data recording surface), and a read/write performance of the hard disk drive is negatively affected.

SUMMARY OF THE INVENTION

The present general inventive concept provides a cover assembly of a hard disk drive having a damper to absorb external shocks applied to a cover member.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a cover assembly of a hard disk drive, including a cover member having an edge portion protruding a predetermined height from an upper surface thereof, a damping plate disposed on the upper surface of the cover member, and a damper to absorb shocks applied to the edge portion of the cover member, the damper having a support portion disposed between a bottom surface of a border portion of the damping plate and the upper surface of the cover member to support the damping plate, and a protrusion extending upward from the support portion through a gap between the edge portion and the damping plate.

The protrusion of the damper may have a height that is higher than the edge portion of the cover member.

The height of the protrusion may be higher than the edge portion of the cover member by about 0.5 to 1.0 mm.

The damper may have a substantially rectangular shape, and be disposed along a corner portion defined by the upper surface of the cover member and a side surface of the edge portion.

The cover member and the damping plate may be spaced apart by the support portion of the damper by a distance to form an air-gap enclosed by the damper between the cover member and the damping plate.

The damper may be made of a viscoelastic material, for example, rubber.

The damper may be bonded to each of the cover member and the damping plate using an adhesive.

The damper may be formed with a shock-absorbing adhesive, for example, an epoxy-based adhesive.

The damper may be formed by applying the adhesive to a corner portion defined by the upper surface of the cover member and a side surface of the edge portion, and pressing the adhesive with the damping plate such that a first portion of the adhesive is forced to flow between the upper surface of the cover member and the bottom surface of the damping plate to form the support portion, and a second portion of the adhesive is forced to flow upward through the gap between the edge portion and the damping plate to form the protrusion.

The foregoing and/or other aspects of the present general inventive concept are also achieved by providing a cover assembly usable with a hard disk drive, the assembly including a cover member having an upper surface, a damping plate disposed above the upper surface of the cover member, and a damper arranged between an edge region of the damping plate and the upper surface of the cover member to support the edge of the damping plate above the upper surface of the cover member.

The foregoing and/or other aspects of the present general inventive concept are also achieved by providing a cover assembly usable with a hard disk drive, including a cover member, a metal plate disposed on the cover member, and a shock-absorbing adhesive to bond the metal plate to the cover member at a predetermined portion of the cover member and extending along a side portion of the metal plate.

The foregoing and/or other aspects of the present general inventive concept are also achieved by providing a cover assembly usable with a hard disk drive, including a cover member having an edge portion disposed around an outer perimeter thereof and protruding at an angle outwardly therefrom, a plate indirectly attached to the cover member, and an adhesive having a first portion to support the plate on the cover member and to absorb first external shocks to the plate, and a second portion extending upward between the edge portion of the cover member and a side portion of the plate to absorb second external shocks to the edge portion of the cover member.

The foregoing and/or other aspects of the present general inventive concept are also achieved by providing a hard disk drive, including a housing having a cover portion and a base portion, a disk to rotate in between the cover portion and the base portion, a read/write head movable to one or more positions on the disk, and a damping plate disposed on the cover portion of the housing and being suspended above an upper surface of the housing by an elastic adhesive arranged at a plurality of predetermined portions of the cover portion.

The foregoing and/or other aspects of the present general inventive concept are also achieved by providing a hard disk drive, including a housing having a cover portion and a base portion, a disk to rotate between the cover and base portions of the housing a damping plate disposed above an upper surface of the cover portion, and a damper arranged between a side portion of the damping plate and an edge portion of the cover portion.

The foregoing and/or other aspects of the present general inventive concept are also achieved by providing a method of manufacturing a cover assembly of a hard disk drive including a cover member with an edge portion protruding a predetermined height from an upper surface thereof and a damping plate disposed on the upper surface of the cover member, the method including applying an adhesive to a portion defined by the upper surface of the cover member and a side surface of the edge portion, and pressing the adhesive with the damping plate such that a first portion of the adhesive is forced to flow between the upper surface of the cover member and a bottom surface of the damping plate to form a support portion and a second portion of the adhesive is forced to flow upward through a gap between the edge portion of the cover member and the damping plate to form a protrusion.

The foregoing and/or other aspects of the present general inventive concept are also achieved by providing a cover assembly usable with a hard disc drive, including a cover member formed of a first material and having an edge portion surrounding and extending upwardly and away from an upper surface thereof, a plate indirectly attached to the upper surface of the cover member within and adjacent to the edge portion thereof and formed of a second material to absorb shocks applied thereto, and a damping member disposed between an edge portion of the plate and the edge portion of the cover member and between a bottom edge of the plate and the upper surface of the cover member, the damping member being formed of an adhesive material softer than the plate.

According to the embodiments of the present general inventive concept, external shocks applied to the cover member are effectively absorbed by the protrusion of the damper provided in the cover member, so that shock energy transferred into the hard disk drive can be minimized.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
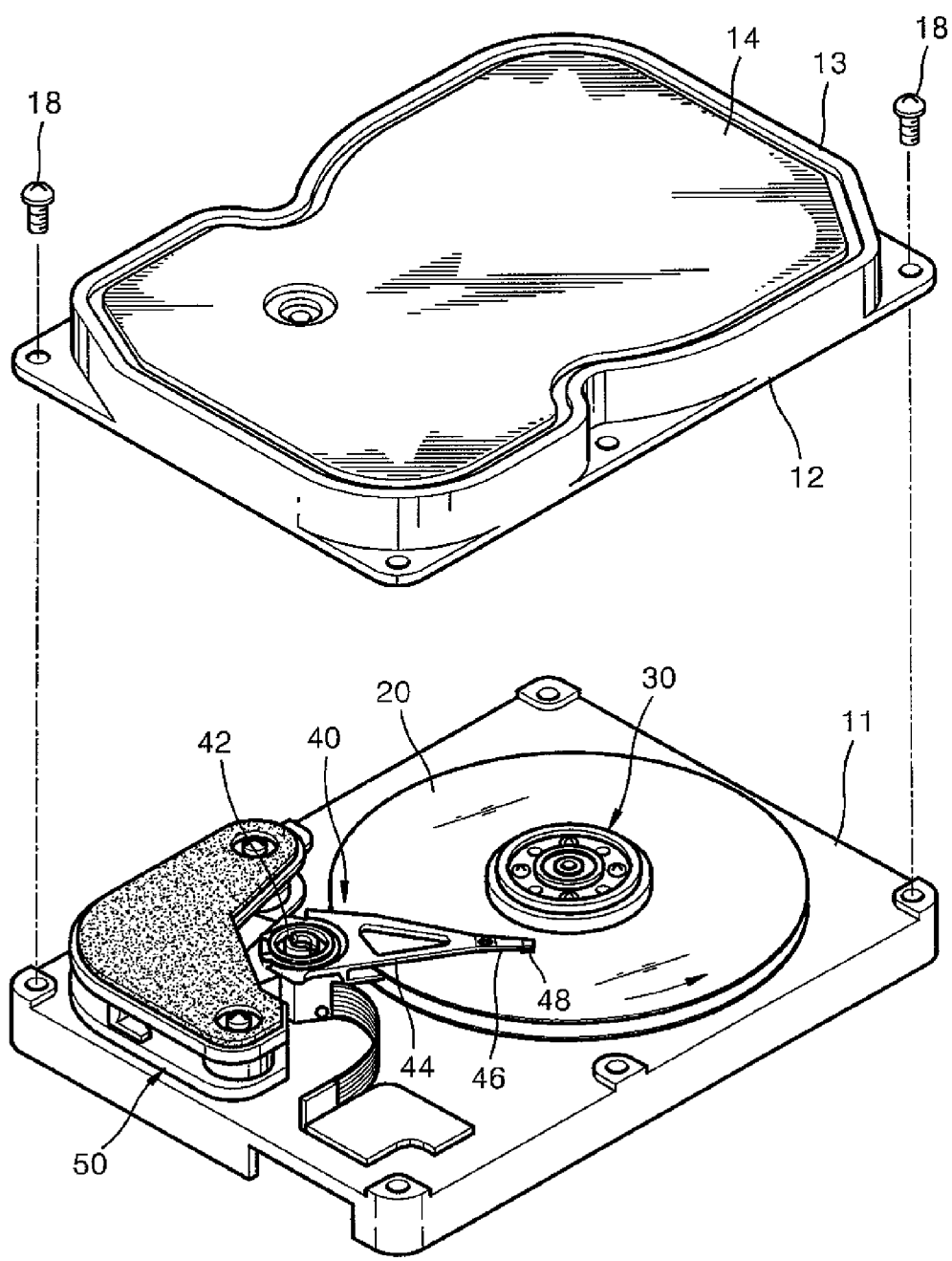
FIG. 1 is an exploded perspective view illustrating an example of a conventional hard disk drive.
Figure 2:
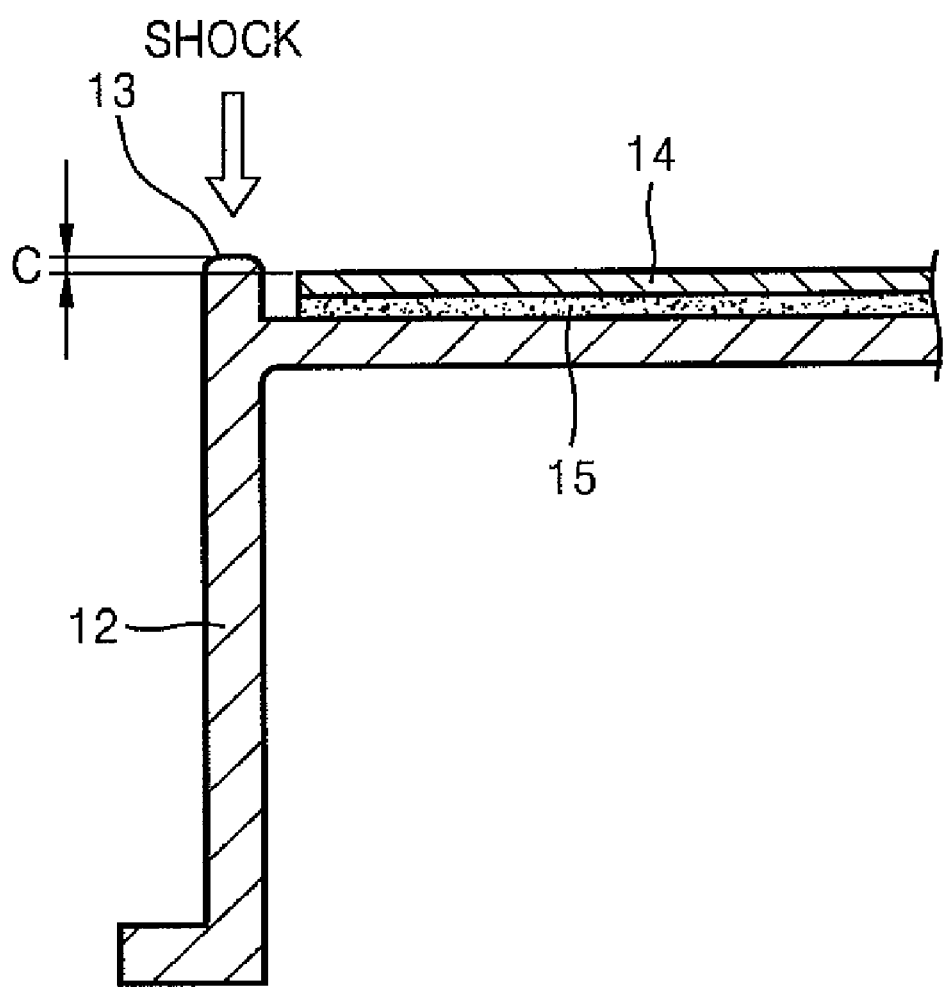
FIG. 2 is a partial sectional view illustrating a cover member of the conventional hard disk drive of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
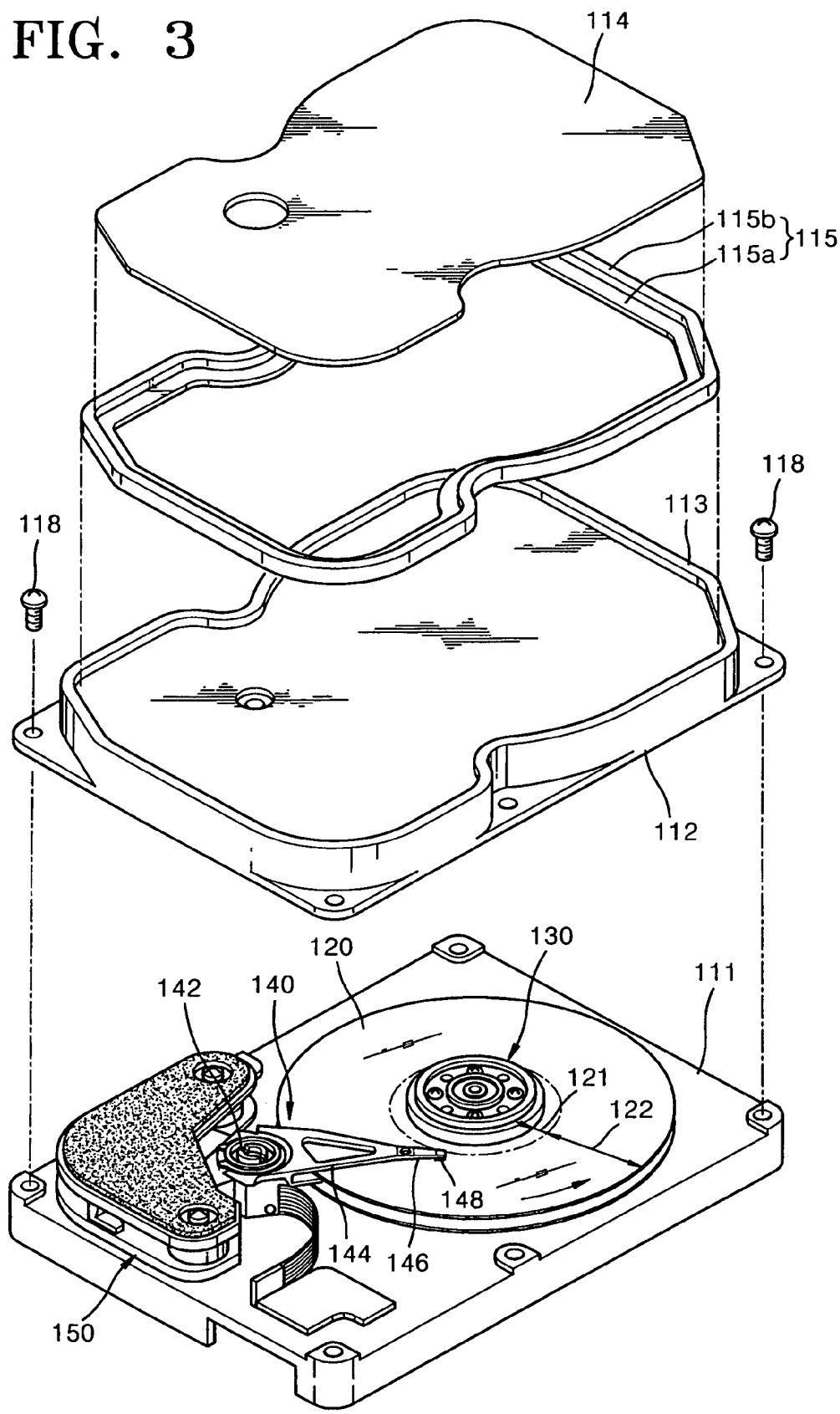
FIG. 3 is an exploded perspective view illustrating a hard disk drive with a cover assembly, according to an embodiment of the present general inventive concept.
Figure 4:
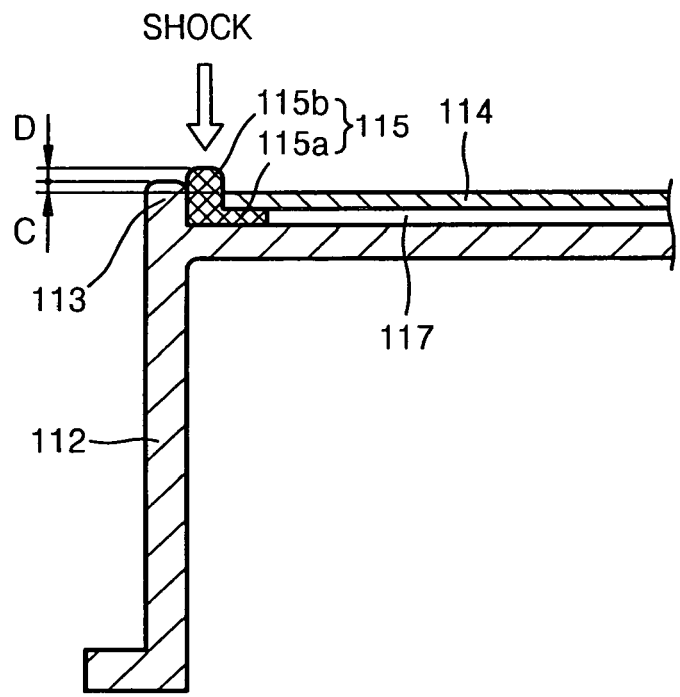
FIG. 4 is a partial sectional view illustrating the cover assembly of the hard disk drive of FIG. 3.

FIG. 3 is an exploded perspective view illustrating a hard disk drive with a cover assembly according to an embodiment of the present general inventive concept, and FIG. 4 is a partial sectional view illustrating the cover assembly of FIG. 3.

Referring to FIGS. 3 and 4, the hard disk drive includes a disc 120 to store data, a spindle motor 130 to rotate the disc 120, and an actuator 140 having a read/write head. The disc 120, the spindle motor 130, and the actuator 140 are covered and protected by a base member 111 and a cover member 112.

The disc 120 is a recording medium to record data. The disc 120 includes inner and outer circumferences, respectively, a parking zone 121 in which to park the read/write head when an operation of the hard disk drive is stopped, and a data zone 122 in which to record data.

The spindle motor 130 rotates the disc 120, and is installed and supported on the base member 111.

The actuator 140 moves the read/write head to a certain position above the disc 120 to record or reproduce (i.e., read) data to/from the disc 120, respectively. The actuator 140 is rotatably installed on the base member 111. Specifically, the actuator 140 includes a swing arm 144 rotatably coupled to a pivot 142 installed on the base member 111, a suspension 146 installed at one end of the swing arm 144 to support a slider 148 that biases the read/write head toward a surface of the disc 120, and a voice coil motor (VCM) 150 to rotate the swing arm 144.

The voice coil motor 150 is controlled by a servo control system so that the swing arm 144 is rotated in a direction according to Fleming's left-hand rule by an interaction between an input electric current of a VCM coil and a magnetic field of a magnet. That is, when the hard disk drive is turned ON and the disc 120 starts to rotate, the voice coil motor 150 moves the swing arm 144 clockwise to move the slider 148 that biases the read/write head from the parking zone 121 of the disc 120 to a position in the data zone 122. The slider 148 is raised at a certain height from the surface of the disc 120 by a lift force generated by the rotating disc 120. In this state, the read/write head mounted on the slider 148 reproduces (i.e., reads) or records data from/to the surface of the disc 120.

On the other hand, when the hard disk drive does not operate, that is, when the disc 120 stops rotating, the voice coil motor 150 moves the swing arm 144 counterclockwise to park the read/write head mounted on the slider 148 in the parking zone 121 of the disc 120.

Generally, a head parking system can be a ramp loading type or a contact start stop (CSS) type. The ramp loading type head parking system is a system that secures a wider data storage space by providing a ramp (not shown) outside of a disc instead of providing a parking zone at an inner circumference of the disc, so that the head is parked on the ramp. The contact start stop (CSS) type head parking system is described above with respect to the parking zone 121 of the disc 120. However, it should be understood that the present general inventive concept can be used with a hard disk drive having a ramp loading type head parking system as well a CSS type head parking system.

Referring to FIGS. 3 and 4, the cover assembly of the present embodiment includes the base member 111, the cover member 112, a damping plate 114 disposed on the cover member 112, and a damper 115, at least a portion of which is inserted between the cover member 112 and the damping plate 114.

The cover member 112 is coupled to the base member 111 via a plurality of fastening screws 118. However, it should be understood that other types of fasteners may also be used with the hard disk drive. The cover member 112 has an edge portion 113 protruding by a predetermined height above an upper surface thereof. The cover member 112 may, for example, be made of an aluminum alloy and can be fabricated by a die casting method.

The damping plate 114 absorbs shocks applied to the hard disk drive and noise insulates the hard disk drive. The damping plate 114 may be fabricated by a press machining of, for example, a stainless steel plate.

The damper 115 is an element that absorbs external shocks applied to the edge portion 113 of the cover member 112 and fixes the damping plate 114 to the upper surface of the cover member 112. The damper 115 may have a substantially rectangular shape and may be disposed along a corner portion defined by the upper surface of the cover member 112 and a side surface of the edge portion 113. The damper 115 may be made of a viscoelastic material, such as rubber. Other types of viscoelastic materials may also be used for the damper 115. The damper 115 may be bonded to the upper surface of the cover member 112 using an adhesive. Also, the damping plate 114 can be bonded to the damper 115 using an adhesive. That is, a liquid adhesive may be applied between the damper 115 and the cover member 112 and between the damper 115 and the damping plate 114. Alternatively, a double sided adhesive tape may be used.

The damper 115 has a support portion 115a disposed between a bottom surface of an outer border portion of the damping plate 114 and the upper surface of the cover member 112 to support the damping plate 114, and a protrusion 115b extending upwardly from the support portion 115a through a gap between the edge portion 113 and the outer border portion of the damping plate 114. The protrusion 115b of the damper 115 is formed to have a height that is higher than the edge portion 113. That is, as illustrated in FIG. 4, the protrusion 115b of the damper 115 has a height that is higher than the edge portion 113 by a height "D." Herein, the height "D" may be about 0.5 to 1.0 mm. As illustrated in FIG. 4, the edge portion 113 of the cover member 112 has a height that is higher than an upper surface of the damping plate 114 by a height "C."

Accordingly, when the damper 115 is inserted between the cover member 112 and the damping plate 114 and has the protrusion 115b that is higher than the edge portion 113 of the cover member 112, the external shocks applied to the cover member 112 are first concentrated on the protrusion 115b of the damper 115. Since the damper 115 is made of the viscoelastic material, the shocks applied thereto are sufficiently absorbed, thereby minimizing shock energy transferred to the hard disk drive and/or the components thereon.

The cover member 112 and the damping plate 114 may be spaced apart a distance from each other by the support portion 115a such that a space enclosed by the damper 115 (i.e., an air-gap 117) is formed between the cover member 112 and the damping plate 114.

The air-gap 117 formed between the cover member 112 and the damping plate 114 serves as an air damper to absorb shock energy applied to the damping plate 114, which improves shock-absorbing efficiency of the cover assembly for external shocks.

The damper 115 can be formed by pre-molding the viscoelastic material, for example, rubber, in a shape as illustrated in FIGS. 3 and 4. However, the damper 115 may also be formed using other methods, such as the method described below.

Figure 5A:
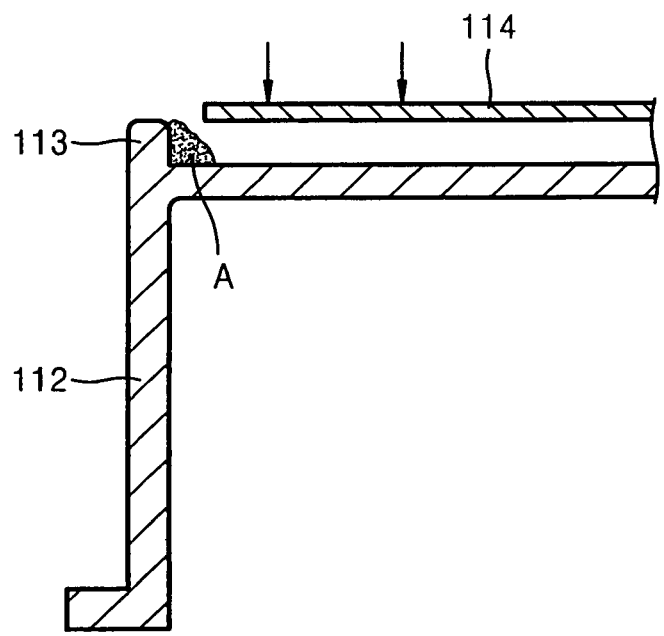
FIGS. 5A and 5B are sectional views illustrating a method of forming a damper of a hard disk drive, according to another embodiment of the present general inventive concept.
Figure 5B:
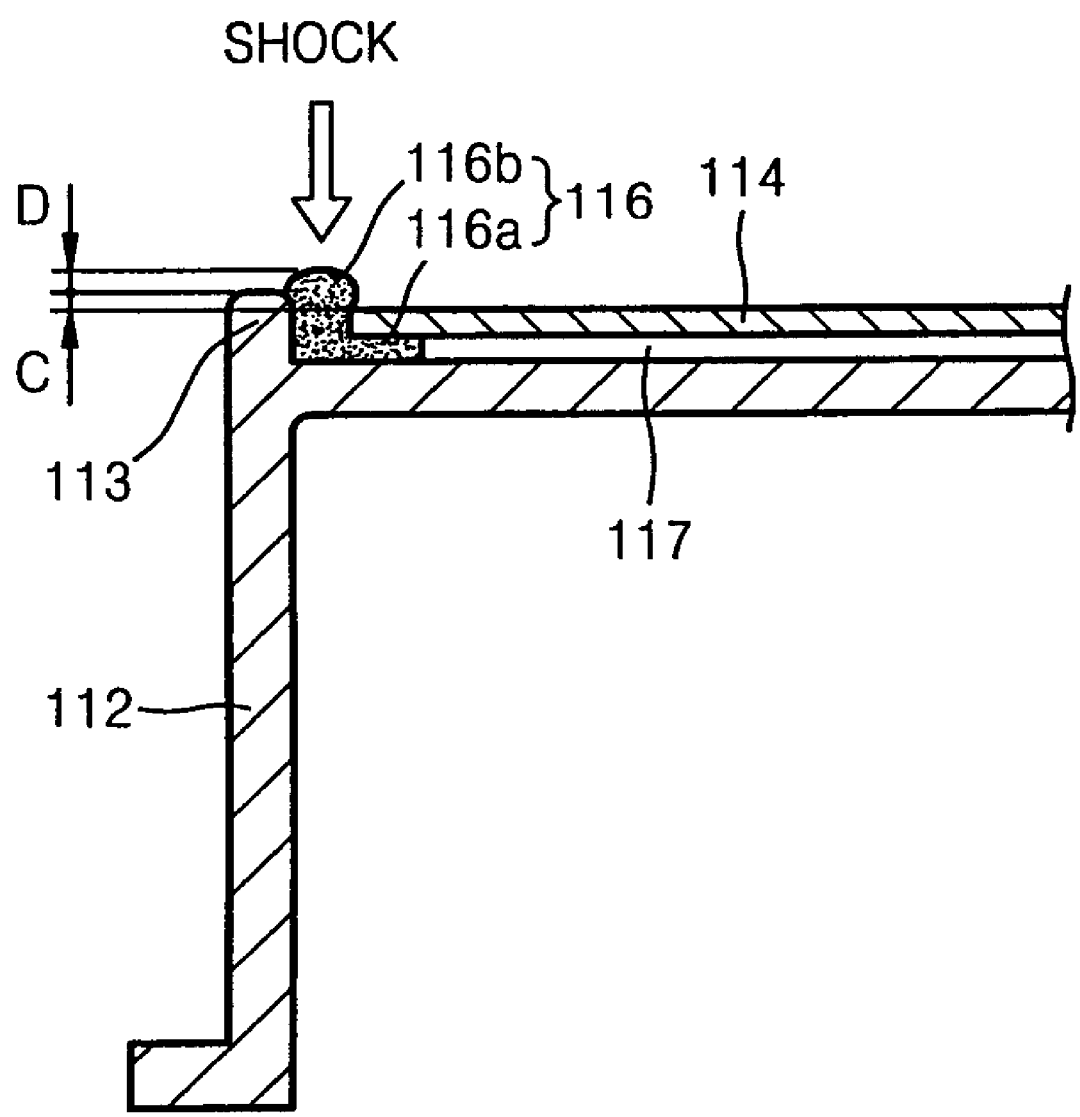

FIGS. 5A and 5B are sectional views illustrating a method of forming a damper 116 according to another embodiment of the present general inventive concept. The damper 116 may be similar to the damper 115 of FIGS. 3 and 4. For example, the dampers 115 and 116 may have a similar shape including relative heights "D" and "C."

Referring to FIGS. 5A and 5B, a shock-absorbing adhesive A, for example, an epoxy-based adhesive, is applied to the corner portion defined by the upper surface of the cover member 112 and the side surface of the edge portion 113. The adhesive A may be applied in a liquid or paste state. The damping plate 114 is then pressed on the cover member 112. Accordingly, a portion of the adhesive A is forced to flow between the upper surface of the cover member 112 and the bottom surface of the damping plate 114 to form a support portion 116a of the damper 116, and another portion of the adhesive A is forced to flow upward through the gap between the edge portion 113 and the damping plate 114 to form a protrusion 116b.

The damper 116 formed by the method of FIGS. 5A and 5B may have a similar structure and operation as the damper 115 of FIGS. 3 and 4.

As described above, according to the various embodiments of the present general inventive concept, a damper is installed at an upper surface of a cover member such that the damper has a protrusion that is higher than an edge portion of the cover member. Accordingly, external shocks applied to the cover member can be absorbed more efficiently by the protrusion of the damper, and shock energy transferred to a hard disk drive is minimized so that an impact of a head on a disk that would result from the external shocks, can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A cover assembly of a hard disk drive, comprising:
a cover member with an edge portion protruding a predetermined height from an upper surface thereof;
a damping plate disposed on the upper surface of the cover member; and
a damper to absorb shocks applied to the edge portion of the cover member, the damper having a support portion disposed between a bottom surface of a border portion of the damping plate and the upper surface of the cover member to support the damping plate, and a protrusion extending upward from the support portion through a gap between the edge portion of the cover member and the damping plate.

2. The cover assembly according to claim 1, wherein the protrusion of the damper has a height that is higher than the edge portion of the cover member.

3. The cover assembly according to claim 2, wherein the height of the protrusion is higher than the edge portion of the cover member by about 0.5 to 1.0 mm.

4. The cover assembly according to claim 1, wherein the damper has a substantially rectangular shape and is disposed along a corner portion defined by the upper surface of the cover member and a side surface of the edge portion.

5. The cover assembly according to claim 1, wherein the cover member and the damping plate are spaced apart by the support portion by a distance to form an air-gap enclosed by the damper between the cover member and the damping plate.

6. The cover assembly according to claim 1, wherein the damper comprises a viscoelastic material.

7. The cover assembly according to claim 6, wherein the viscoelastic material comprises rubber.

8. The cover assembly according to claim 6, wherein the damper is bonded to each of the cover member and the damping plate using an adhesive.

9. The cover assembly according to claim 1, wherein the damper is formed with a shock-absorbing adhesive.

10. The cover assembly according to claim 9, wherein the shock-absorbing adhesive is an epoxy-based adhesive.

11. The cover assembly according to claim 9, wherein the damper is formed by applying the adhesive to a corner portion defined by the upper surface of the cover member and a side surface of the edge portion, and pressing the adhesive with the damping plate such that a first portion of the adhesive is forced to flow between the upper surface of the cover member and the bottom surface of the damping plate to form the support portion, and a second portion of the adhesive is forced to flow upward through the gap between the edge portion and the damping plate to form the protrusion.

12. A cover assembly usable with a hard disk drive, comprising:
a cover member;
a metal plate disposed on the cover member; and
a shock-absorbing adhesive to bond the metal plate to the cover member at a predetermined portion of the cover member and extending along a side portion of the metal plate and on an upper surface of the cover member,
wherein the shock absorbing adhesive has an L shape with a first portion extending between the metal plate and the cover member and a second portion extending above the metal plate.

13. A cover assembly usable with a hard disk drive, comprising:
a cover member having an edge portion disposed around an outer perimeter thereof and protruding at an angle outwardly therefrom;
a plate indirectly attached to the cover member; and
an adhesive having a first portion to support the plate on the cover member and to absorb first external shocks to the plate, and a second portion extending upward between the edge portion of the cover member and a side portion of the plate to absorb second external shocks to the edge portion of the cover member.

14. A hard disk drive, comprising:
a housing having a cover portion and a base portion;
a disk to rotate between the cover and base portions of the housing;
a damping plate disposed above an upper surface of the cover portion; and
a damper arranged between a side portion of the damping plate and an edge portion of the cover portion and between the damping plate and the cover portion,
wherein the damper extends beyond an upper surface of the damping plate.

15. The hard disk drive according to claim 14, wherein the damper extends from an area between the side portion of the damping plate and the edge portion of the cover portion to an area between the upper surface of the cover portion to support an edge of the damping plate above the upper surface of the cover.

16. The hard disk drive according to claim 14, wherein the damper comprises a plurality of L-shaped viscoelastic parts disposed at corners of the cover portion.

17. A cover assembly of a hard disk drive, comprising:
a cover member having a first edge portion;
a damping plate having a second edge portion facing the first edge portion disposed on a first surface of the cover member; and
a damper disposed between the damping plate and the first surface of the cover member and between the first and second edge portions,
wherein the damper extends beyond an upper surface of the damping plate.

* * * * *